(12) United States Patent
Parruck et al.

(10) Patent No.: US 7,145,910 B2
(45) Date of Patent: Dec. 5, 2006

(54) METHODS AND APPARATUS FOR DYNAMICALLY ALLOCATING BANDWIDTH BETWEEN ATM CELLS AND PACKETS

(75) Inventors: Bidyut Parruck, Cupertino, CA (US); Joseph A. Nguyen, San Jose, CA (US); Chulanur Ramakrishnan, Saratoga, CA (US)

(73) Assignee: Cortina Systems, Inc., Mountain View, CA (US)

( * ) Notice: Subject to any disclaimer, the term of this patent is extended or adjusted under 35 U.S.C. 154(b) by 275 days.

(21) Appl. No.: 10/869,379

(22) Filed: Jun. 15, 2004

(65) Prior Publication Data

US 2004/0228355 A1 Nov. 18, 2004

Related U.S. Application Data

(63) Continuation of application No. 09/539,478, filed on Mar. 30, 2000, now Pat. No. 6,751,214.

(51) Int. Cl.
*H04J 3/24* (2006.01)
*H04L 12/56* (2006.01)

(52) U.S. Cl. .................... 370/395.1; 370/471; 370/474

(58) Field of Classification Search ............. 370/395.1, 370/471, 474
See application file for complete search history.

(56) References Cited

U.S. PATENT DOCUMENTS 5,568,477 A 10/1996 Galand et al.
6,075,788 A * 6/2000 Vogel .................... 370/395.51
6,317,433 B1 * 11/2001 Galand et al. ........... 370/395.2
6,463,477 B1 * 10/2002 Fontenot .................... 709/236
6,477,168 B1 11/2002 Delp et al.
6,512,747 B1 * 1/2003 Umeuchi et al. ......... 370/310.1
6,594,279 B1 * 7/2003 Nguyen et al. ............. 370/468
6,671,832 B1 12/2003 Apisdorf
6,765,928 B1 * 7/2004 Sethuram et al. ........... 370/476
6,771,663 B1 8/2004 Jha
6,804,246 B1 * 10/2004 Petersen et al. ........ 370/395.64
6,839,352 B1 * 1/2005 Vogel ...................... 370/395.1
6,909,720 B1 * 6/2005 Willis .................... 370/395.52
6,963,572 B1 * 11/2005 Carr et al. .................. 370/401
6,982,957 B1 * 1/2006 Kiiski et al. ................ 370/235
6,999,479 B1 * 2/2006 Jha ........................... 370/535
7,006,525 B1 * 2/2006 Jha ........................... 370/466

* cited by examiner

*Primary Examiner*—Alpus H. Hsu (57) ABSTRACT

A method for dynamically allocating bandwidth among ATM cells and packets scheduled for output from an aggregation multiplexer of a transport-layer device configured to multiplex both ATM cells and packets onto the same channel of an optical fiber. The method includes local control and relative priority lookup of incoming ATM cells and packets to support output decision. When compared to currently employed methods, the required level of coordination with the receiving circuit for dynamic bandwidth allocation is substantially lower, thereby reducing operational complexity for network operators and latency for critical data when reallocating bandwidth.

5 Claims, 9 Drawing Sheets

METHODS AND APPARATUS FOR DYNAMICALLY ALLOCATING BANDWIDTH BETWEEN ATM CELLS AND PACKETS

CROSS-REFERENCE TO RELATED APPLICATION

This application is a continuation of, and claims the benefit under 35 U.S.C. § 120 of, application serial number 09/539,478, filed Mar. 30, 2000, now U.S. Pat. No 6,751,214.

BACKGROUND OF THE INVENTION

The present invention relates to improved methods and apparatus for transmitting information via a communication link. More importantly, the present invention relates to improved protocols, methods, and devices for transmitting both ATM and packet data over a transport-layer protocol such as SONET in a manner that facilitates more efficient dynamic allocation of bandwidth and traffic management.

The use of the SONET (Synchronous Optical Network) as a transport mechanism at the transport-layer for both (Asynchronous Transfer Mode) ATM and packet data is well known. As the term is employed herein, data includes any type of information that may be represented digitally, and includes such time-sensitive data such as streaming video or voice, and/or non time-sensitive data such as computer files. Packet technology includes TCP/IP, token ring, etc. One example of packet technology is IP (Internet Protocol) packets transmitted over OSI layer 2. Another example of packet technology is Ethernet. ATM and SONET technologies are well known and well defined and will not be elaborated further here. Similarly, the various layers of the OSI 7-layer model are also well known and well defined.

Figure 1:
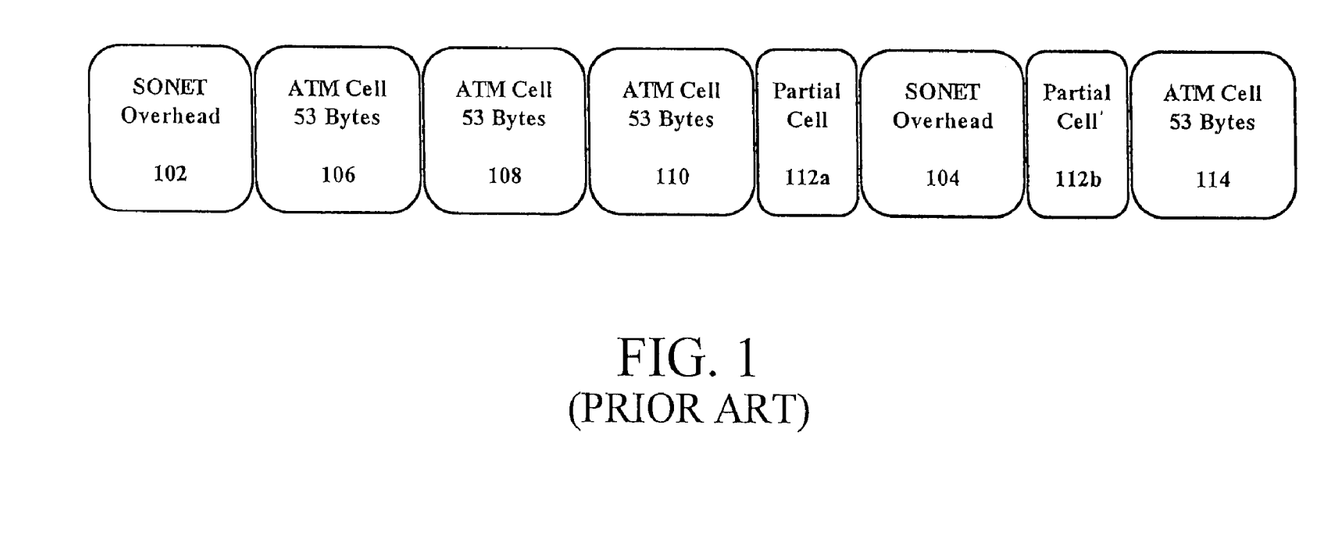
FIG. 1 is a prior art logical depiction of ATM cells transported within SONET frames in an arrangement commonly known as ATM-over-SONET in an unchannelized optical fiber.

Typically speaking, ATM traffic or packet traffic do not mix in the same unchannelized optical fiber, or in the same TDM channel if the optical fiber is channelized. In the former case, one may think of the entire fiber as a single channel, which is employed to transport either ATM traffic or packet traffic. To facilitate discussion, FIG. 1 is a prior art logical depiction of ATM cells transported within SONET frames in an arrangement commonly known as ATM-over-SONET in an unchannelized optical fiber. As can be seen in FIG. 1, a plurality of ATM cells (53 bytes each) may be packed into a single SONET frames (such as in between SONET overhead blocks 102 and 104). Although only four full ATM cells 106, 108, 110, and 114 are shown, one skilled in the art will appreciate that a typical. SONET payload may have the capacity to carry many cells. If there is no room left in a SONET frame to put an entire cell therein, the SONET circuitry may break up a cell and transport a partial cell in that SONET frame (as shown with partial cell 112a). The remaining portion of the cell that was broken up is then transported in the next SONET frame (as shown with partial cell 112b). Furthermore, if there are no ATM cells to transport in a SONET frame, idle cells are typically inserted to fill the frame. Note that since SONET operates at a lower level, as far as the ATM layer is concerned, the fact that an ATM cell was broken up and reassembled by the SONET layer is completely transparent.

Figure 2:
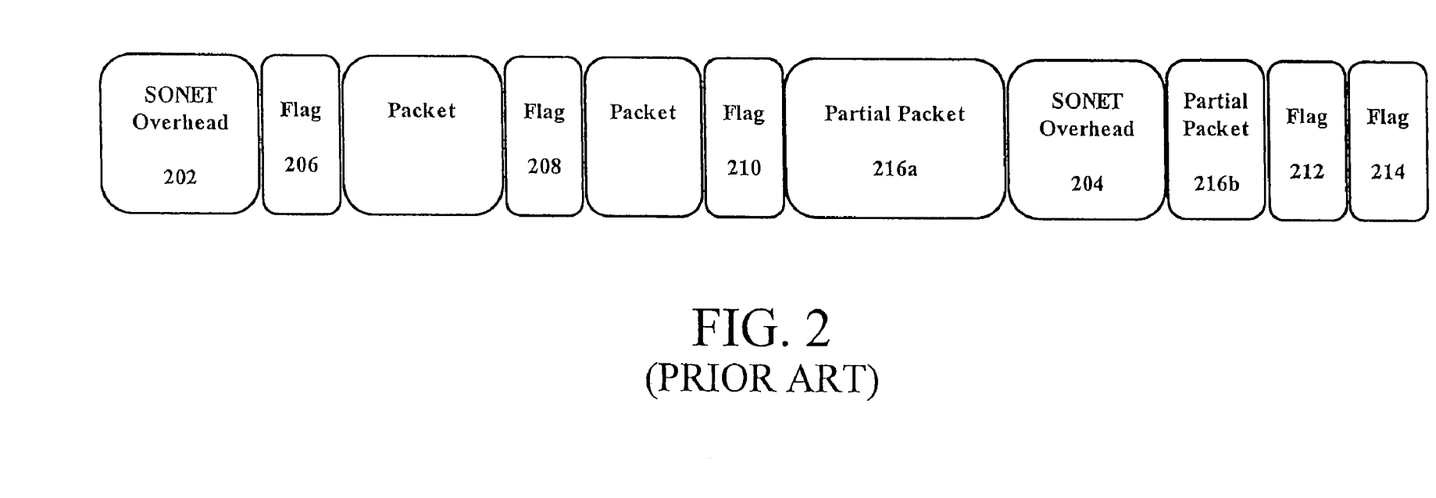
FIG. 2 is a prior art logical depiction of packets transported within SONET frames in an arrangement commonly known as packet-over-SONET in an unchannelized optical fiber.

FIG. 2 is a prior art logical depiction of packets transported within SONET frames in an arrangement commonly known as packet-over-SONET in an unchannelized optical fiber. Similar to the situation of FIG. 1, a plurality of packets (which may be variable in length) may be packed into a single SONET frame (such as in between SONET overhead blocks 202 and 204. However, since the packets may have variable lengths, flags are employed between packets to help delineate where the packets are in the data stream. With reference to FIG. 2, these flags are shown as flags 206, 208, 210, 212, and 214. Flag 214 is a flag inserted to fill in the frame if there is no packet data to fill. Again, if the frame is full, a packet may be broken up to be transported in different frames. This is shown with packet 216, which is shown broken up into partial packets 216a and 216b and transported in two different frames. Again, since SONET operates at a lower level, as far as the packet layer is concerned, the fact that a packet was broken up and reassembled by the SONET layer is completely transparent.

In either case, the entire unchannelized optical fiber is used to transport only ATM traffic (FIG. 1) or packet traffic (FIG. 2). To allow ATM traffic and packet traffic to share a single optical fiber, the optical fiber may be channelized into different time division multiplex (TDM) channels. Within each channel, the traffic is again either entirely ATM or entirely packet. This situation is logically depicted in FIG. 3.

Figure 3:
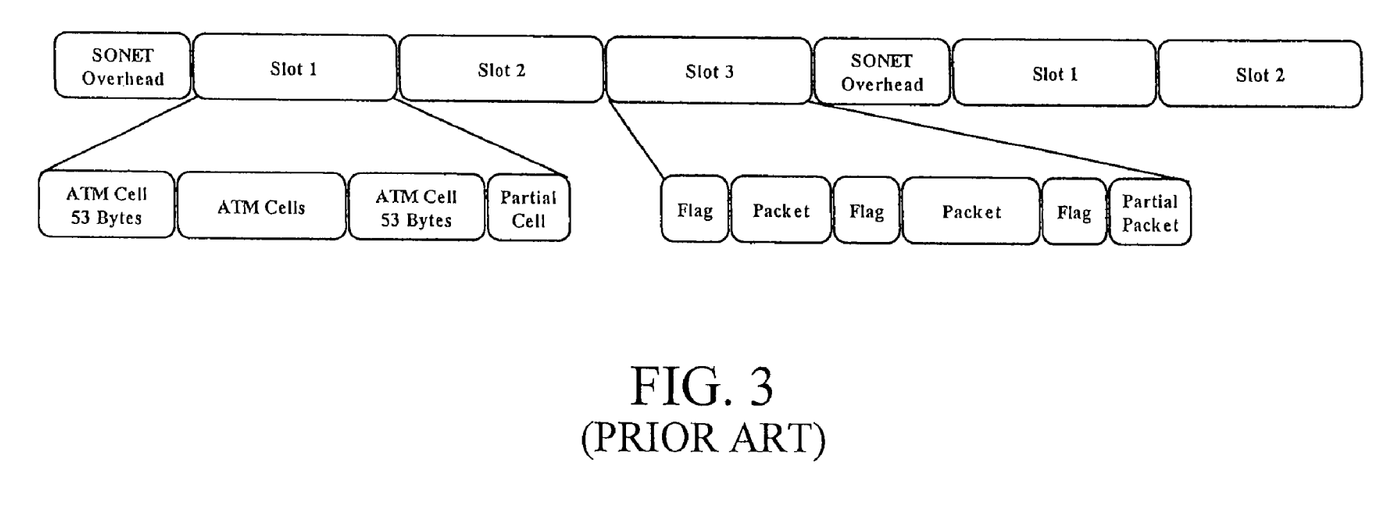
FIG. 3 shows a prior arrangement that allows ATM traffic and packet traffic to share a single optical fiber in separate time division multiplex (TDM) channels.

In FIG. 3, an STS-3 SONET transport arrangement is shown, wherein the full bandwidth of the optical fiber is channelized into three different STS-1 channels or time slots: slots 1, 2, and 3. ATM cells are shown packed into slot 1, while packets are shown packed into slot 3 to illustrate that ATM and packet traffic may occupy different channels to share the optical fiber. Again, both ATM cells and packets may be broken up for transport in parts if the bandwidth available in a slot is already full.

Figure 4:
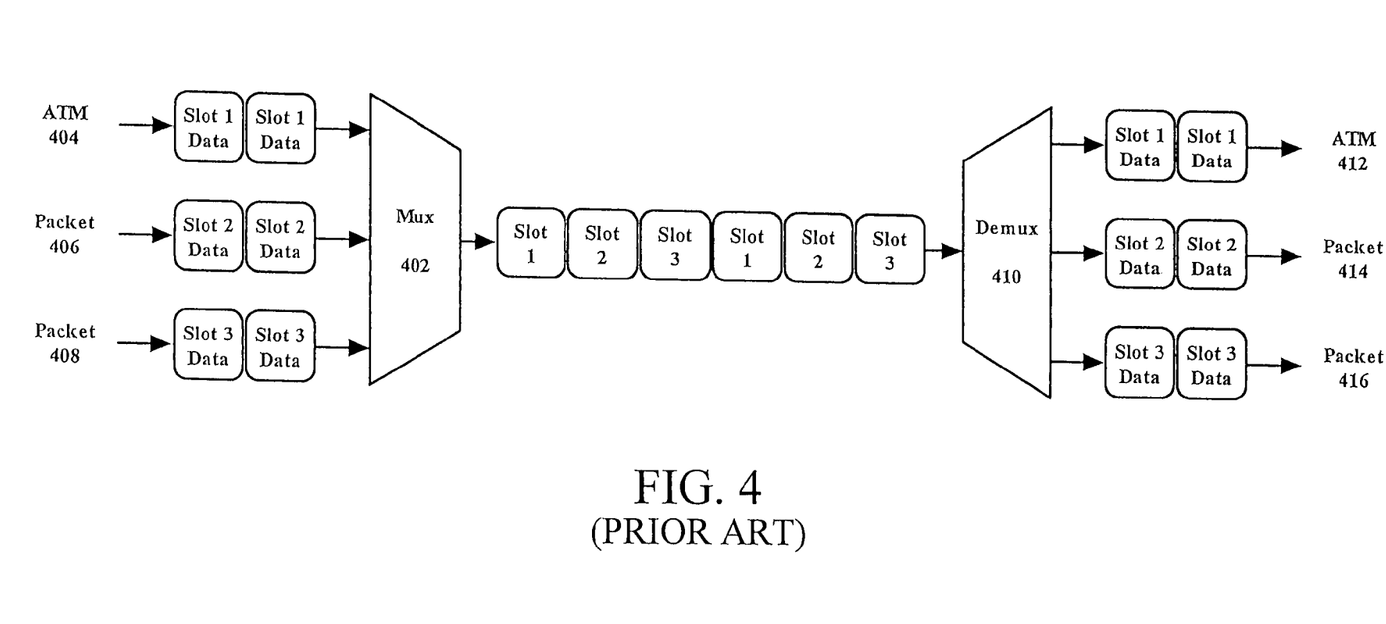
FIG. 4 shows, in a high level depiction, how ATM and packet data from various sources may be multiplexed into different separate channels in the same optical fiber.

Prior art FIG. 4 shows, in a high level depiction, how ATM and packet data from various sources may be multiplexed into different separate channels in the same optical fiber. With reference to FIG. 4, ATM data is destined for slot 1, while packet data is destined for slots 2 and 3. A multiplexer 402 takes data from the ATM stream 404, the packet stream 406, and the packet stream 408, and multiplexes them using a time-division multiplexing scheme onto time slots 1, 2 and 3 respectively. At the other end, a demultiplexer 410 demultiplexes the data into ATM stream 412, packet stream 414, and packet stream 416 respectively.

While the TDM multiplexing scheme of FIGS. 3 and 4 allow ATM traffic and packet traffic to share different separate channels in the same optical fiber, there are disadvantages. By way of example, within each STS-1 channel (which is 51.84 Mbps), the traffic within each channel must be either all ATM cells or all packets. Because of this limitation, the channels must be pre-allocated in advance for each type of traffic. If given type of high-priority traffic (e.g., streaming video over ATM) is assigned to a given channel or time slot, and the bandwidth requirement associated that traffic type increases beyond the capacity of the channel, transmission delay can occur. Even though the network operator can assign one or more additional channels to handle the increase in this ATM traffic, there is a nontrivial time delay associated with the detecting the congestion condition (and possibly concurrently coordinate to unallocate channels previously allocated to other non-priority traffic if there are no free channels left), coordinating with the receiving end to allocate the additional channels, and changing network parameters to allocate the additional channels to handle the increased bandwidth requirement of the high-priority traffic. As can be appreciated from the foregoing, the complex coordination, unallocation of channels and reallocation of them to the priority traffic involves a nontrivial amount of operational complexity and/or time delay. For some types of data (e.g., time-critical data), this delay is unacceptable. For this reason, many network operators tend to reserve an unduly large amount of bandwidth overcapacity to handle potential traffic increases when dealing with time-critical data, which leads to inefficient use of network bandwidth as the reserved bandwidth tends to stay unused most of the time. Furthermore, each traffic type can employ bandwidth only in a discrete, channel-size chunk. If additional bandwidth is allocated to a given traffic type, an entire slot (51.84 Mbits in case of STS-1) is added even if the increase in traffic only requires a portion of the capacity offered by an entire slot.

In view of the foregoing, there are desired improved techniques for allowing ATM traffic and packet traffic to share the bandwidth of a channel in a manner that facilitates dynamic allocation of bandwidth between traffic types and more efficient traffic management.

SUMMARY OF THE INVENTION

The invention relates to techniques for transmitting both ATM cells and packets over a single channel in an optical fiber. The technique includes providing a transport-layer device which is configured to transmit packet data on said optical fiber. The method also includes receiving the ATM cells at the transport-layer device and receiving the packets at the transport-layer device. These ATM cells and packets may come from multiple sources. The method further includes multiplexing, using the transport-layer device, the ATM cells and the packets onto the single channel for transmission. At the receiving end, innovative discrimination techniques facilitate discrimination of the ATM cells from the packets received from the single channel to allow the ATM cells and packets to be sent to their respective destinations.

The invention offers may advantages, including eliminating the need for dividing the optical fiber into separate rigid TDM channels to handle ATM and packet traffic separately therein, eliminating the need for separate optical fibers to handle ATM and packet traffic separately, more efficient traffic management and dynamic bandwidth allocation, and/ or the ability to use packet-only network and switching resources to handle a mix of ATM cells and packets or even ATM cells alone.

In another embodiment, the invention relates to method for dynamically allocating bandwidth among ATM cells and packets transported in the same channel. The method includes receiving the ATM cells at an aggregation multiplexer and receiving the packets at the aggregation multiplexer. The method further includes ascertaining relative priorities of individual ones of the ATM cells and individual ones of the packets, the individual ones of the ATM cells representing ATM cells scheduled for output by the multiplexer, the individual ones of the packets representing packets also scheduled for output by the multiplexer. Additionally, the method also includes multiplexing, using the aggregation multiplexer, one of the ATM cells and the packets onto the channel, the one of the ATM cells and the packets being output having the highest relative priority among the relative priorities.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

Prior art

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one aspect of the present invention, there is provided an aggregated ATM/packet over SONET transmission technique for transmitting both ATM cells and packets over a channel, which may be the entire bandwidth of the optical fiber or part of the bandwidth of the optical fiber, such that the ATM bandwidth and the packet bandwidth can be dynamically allocated with substantially reduced delay and network overhead. In one embodiment, the packet-over-SONET transmission standard is extended to also allow ATM cells to be treated as if they are packets and transmitted in the SONET frame as if they are packets. Within a SONET frame, individual ATM cells and individual packets are delineated with flags of the type typically associated with the packet-over-SONET transmission standard. Since ATM cells are also delineated with flags of the type employed in the packet-over-SONET standard, the present invention is markedly different from the prior art technique of transmitting ATM cells over SONET (such as that shown in FIG. 1), in which flags of the type employed in the packet-over-SONET standard are not employed. Since the technique leverages on existing packet-over-SONET standards and architectures, it is highly user-friendly toward professionals who already are familiar with packet-over-SONET techniques, thereby lowering the training costs associated with implementing the inventive transmission technique. Additionally, many of the circuit components typically associated with packet-over-SONET transmission may be reused in systems that implement the inventive aggregated ATM/packet over SONET transmission technique, thereby lowering implementation and equipment production costs.

In one embodiment, the aggregation multiplexer at the transmit side, which performs the aggregation of ATM cells and packets to allow both to be transmitted over a single channel, is also endowed with traffic management capabilities to allow the aggregation multiplexer to locally decide whether an ATM cell, a particular ATM cell having a particular QoS priority, a packet, or a particular packet having a particular priority, should be multiplexed through next. As will be discussed later, this has important advantages.

As mentioned earlier, the prior art transmit either all ATM cells or all packets within a single optical fiber or within a single channel/time slot. In the channelized case in which the channels are preallocated to a particular type of traffic, the time slot from which the traffic is received yields information pertaining to whether the traffic received is ATM cells or packets. In the current invention, because ATM cells and packets are mixed within the same SONET frame, it is necessary to come up with another way to determine at the receiving end whether the received traffic is an ATM cell or a packet. In one embodiment, this decision is performed by the desegregation demultiplexer at the receiving end based on predefined desegregation criteria. Once the ATM cells and packets are separated, they may be forwarded on to their respective links to be transmitted to their respective destinations.

Figure 5A:
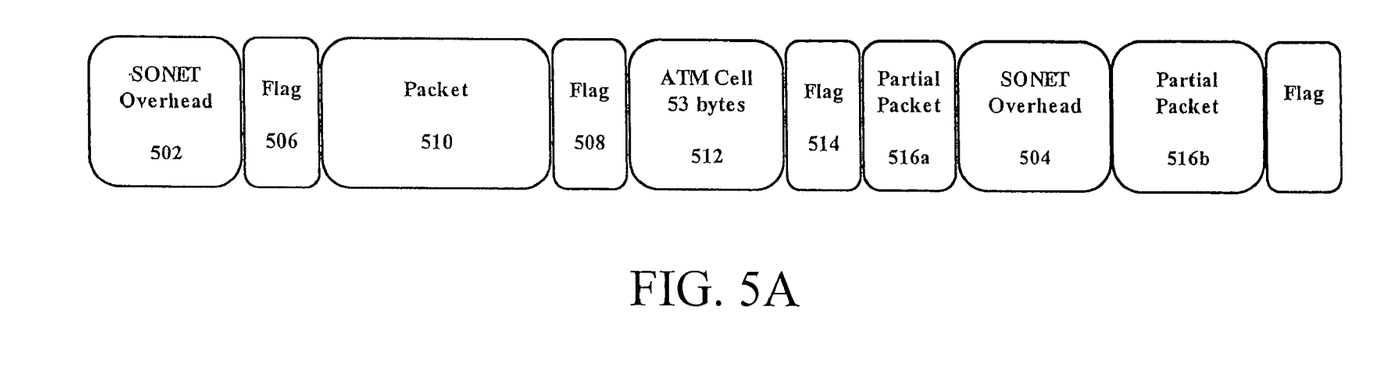
FIGS. 5A and 5B are logical illustrations showing, in accordance with one aspect of the present invention, how both ATM cells and packets can be packed within a SONET frame.

To facilitate discussion, FIG. 5A is a logical illustration showing, in accordance with one aspect of the present invention, how both ATM cells and packets can be packed within a SONET frame. In a nonobvious manner, the present invention treats ATM cells as if they are packets for the purpose of transporting them using a technique similar to those employed in packet-over-SONET systems yet still allows the receiving end to correctly discriminate between ATM cells and packets. Thus, ATM cells can be freely mixed with packets within the same SONET frame. With reference to FIG. 5A, both packets and ATM cells are shown in between SONET overhead blocks 502 and 504 of FIG. 5A. As before, individual packets are delineated by flags. This is illustrated by flags 506 and 508, which delineates a packet 510 as shown. In a counter-intuitive manner, the ATM cells are also delineated with flags of the type employed in the packet-over-SONET transmission standard. With reference to FIG. 5A, the ATM cell 512 is shown delineated by flags 508 and 514. This is so even though ATM cells are of a fixed length. The use of flags to delineate individual ATM cells is counter-intuitive since flag usage incurs bandwidth overhead, and the fact that ATM cells are always 53-byte in size mitigates against the use of flags for delineation purpose since the end of an ATM cell can be readily detected by counting bytes (which is not possible with variable-length packets). Nevertheless, the use of flags with ATM cells allows the inventive transmission system to treat ATM cells as if they are packets for the purpose of framing them within a SONET frame for transmission and yields important traffic management and cost benefits.

Figure 5B:
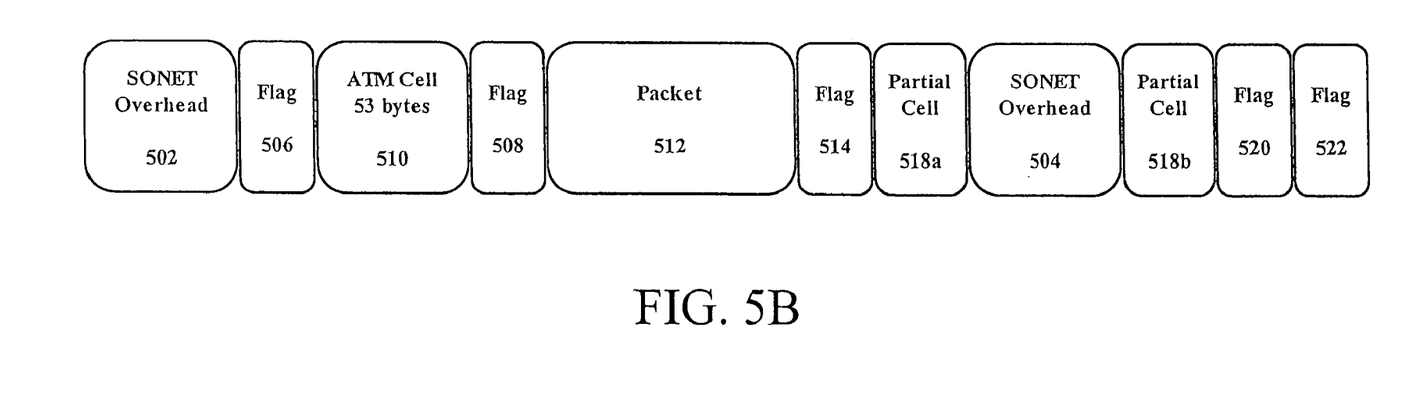

In FIG. 5A, it is shown that a packet 516 can be segmented for partial transmission as packet segments 516a and 516b in different SONET frames if there is not enough room left in one SONET frame for the entire packet 516. In FIG. 5B, it is also shown that an ATM cell can be similarly segmented for partial transmission as ATM cell segments 518a and 518b in different SONET frames if there is not enough room left in one SONET frame for the entire ATM cell 518. This is similar to what was done earlier in connection with FIGS. 1 and 2, except that in the case of FIGS. 5A and 5B, both ATM cells and packets are mixed in the same SONET frame. Also, FIG. 5B shows an extra flag 522 being inserted into the frame. This is depicted to illustrate that like the packet-over-SONET situation, the present invention may fill up a frame with flags if there is not enough data (either ATM or packet) to fill the entire SONET frame.

Figure 6:
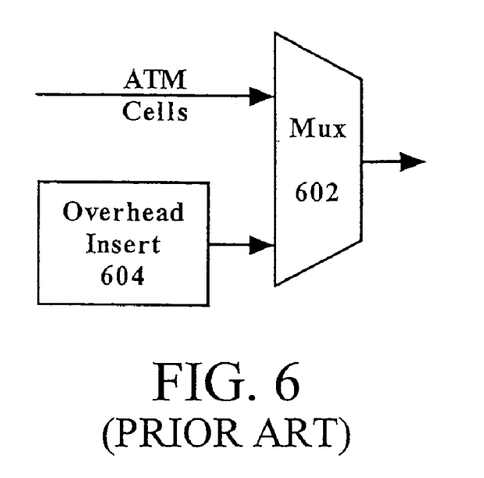
FIG. 6 is a prior art logical illustration showing at a high level how ATM-over-SONET is accomplished at the transmitting end.

FIG. 6 is a prior art logical illustration showing at a high level how ATM-over-SONET is accomplished at the transmitting end. In FIG. 6, the ATM cells are received at the input of multiplexer 602 to be multiplexed with overhead information from overhead insert block 604. The output of multiplexer 602 is substantially as shown in FIG. 1.

Figure 7:
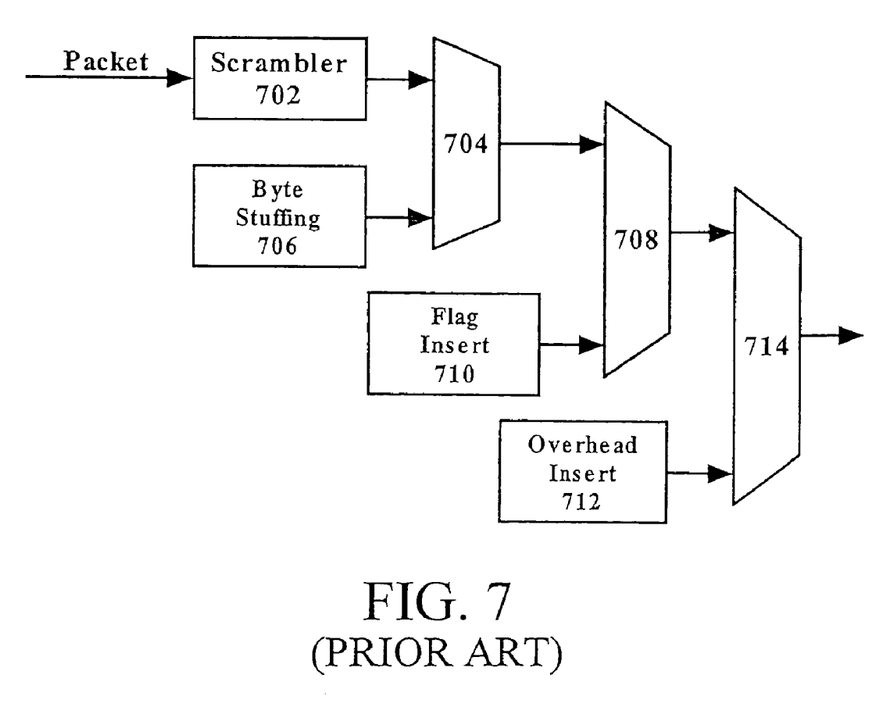
FIG. 7 is a prior art logical illustration showing how packet-over-SONET is accomplished at the transmitting end.

FIG. 7 is a prior art logical illustration showing how packet-over-SONET is accomplished at the transmitting end. In FIG. 7, the packet information is received at a scrambler 702 to be scrambled prior to being multiplexed via a multiplexer 704 with byte-stuffing information from a byte-stuffing block 706. Byte-stuffing block 706 detects the presence of certain reserved octets in the input information, such as the Flag octet (7E hex) that delineates individual packets and Control Escape Octet (7D hex), and replace each octet with a respective known two-octet sequence, such as the 7D5E for 7E and 7D5D for 7D. This byte-stuffing operation is done in accordance with the packet-over-SONET standard. However, since the byte-stuffing operation increases the number of bytes to be transmitted, it potentially exposes the network to a malicious bandwidth-crippling attack if someone sends a volume of packets full of the reserved character strings. Scrambler 702, which was mentioned earlier, avoids this by scrambling the input packets. The output of multiplexer 704 is then multiplexed, via a multiplexer 708, with flags from a flag insert block 710, to delineate the individual packets. Generally speaking, multiplexer 708 receives the end of the packet and inserts the flag into the stream to mark where one packet ends and another begins. The output of multiplexer 708 is then multiplexed, using TDM multiplexer 714, with overhead information from overhead insert block 712. The output of multiplexer 714 is substantially as shown in FIG. 2.

Figure 8:
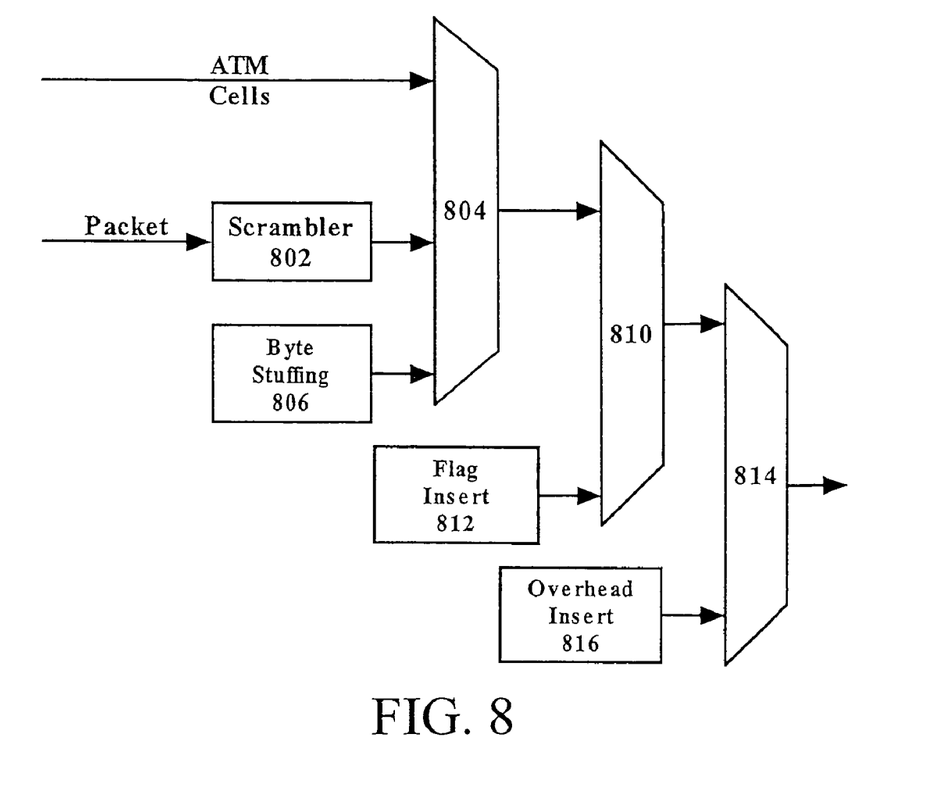
FIG. 8 is a logical illustration that illustrates at a high level, in accordance with one embodiment of the present invention, the transmitting circuit for aggregating both ATM cells and packets onto a single channel.

FIG. 8 is a logical illustration that illustrates at a high level, in accordance with one embodiment of the present invention, the transmitting circuit for aggregating both ATM cells and packets onto a single channel. In FIG. 8, the packet information is received at a scrambler 802 to be scrambled prior to being multiplexed via an aggregation multiplexer 804 with byte-stuffing information from byte-stuffing block 806. Both scrambler 802 and byte-stuffing block 806 work in substantially the same manner as scrambler 702 and byte-stuffing block 706 discussed earlier in connection with FIG. 7.

However, aggregation multiplexer 804 also receives ATM cell traffic. Receiving ATM cell traffic at this point is nonobvious and counterintuitive because the received ATM traffic would be subject to flag insertion with flags typically employed in the packet-over-SONET standard. The use of flags with ATM traffic would be an operation that most ATM engineers would deem to be unwarranted since ATM cells, unlike packets, are always fixed in size (i.e., 53 bytes) and thus flags are ordinarily unnecessary to ascertain where an ATM cell ends.

Nevertheless, ATM traffic is received by aggregation multiplexer 804, which outputs either the ATM cell or a packet, along with byte-stuffing information from byte-stuffing block 806 to a multiplexer 808. In one embodiment, aggregation multiplexer 804 monitors the packets and ATM cells that are input and performs traffic management by deciding whether to output an ATM cell, a particular ATM cell with a particular class of service, a packet, or a particular packet with a particular class of service at its output. By way of example, if higher priority traffic is detected and that higher priority traffic needs additional bandwidth, aggregation multiplexer 804 may choose to output that traffic first and defer outputting other traffic that has a lower priority. This is accomplished by, for example, examining the packet header and the ATM cell headers as they are received and determine which of those has the highest relative priority for output. This lookup could be performed either at the aggregation multiplexer 804 or in advance by another logic block prior to multiplexing. Looking up the priority information of the ATM cells and packets in advance is advantageous as the transmission speed increases, since the processing power required to perform the lookup may be distributed to another processor or multiple processors. Aggregation multiplexer may then receive an input signal from the lookup logic which indicates the relative priority of the ATM cell or the packet.

Since it is not necessary to channelize the fiber optic into rigid TMD channels, aggregation multiplexer 804 has a tremendous flexibility to dynamically allocate as much or as little of the full bandwidth to a particular type of traffic. This particular implementation is particularly advantageous since the bandwidth of the entire optical fiber is available for the higher priority traffic if need be. Furthermore, there is no need to allocate bandwidth in large, discrete chunks such as in the case of TDM channels. The increase in bandwidth could be in smaller chunks (e.g., a predefined bandwidth amount with some extra to handle spikes), which more efficiently utilizes the totally bandwidth available. It is also possible to define in advance with aggregation multiplexer that certain type of traffic, or all traffic, should have a minimum guaranteed bandwidth. The aggregation multiplexer may also includes an output to provide statistical information pertaining to the different types and amount of traffic it receives and/or multiplexes through in order to allow the network operator to optimize network performance and/or alert the operator if certain bandwidth usage parameters associated with certain type of traffic or the entire channel is encountered.

One skilled in the art will realize that other traffic management schemes (including feedback or look-ahead schemes) may also implemented to ensure that the downstream link is not overflowed while the relative bandwidth allocated to different types of traffic are dynamically allocated properly to ensure that the higher priority traffic are given more bandwidth to have a higher quality of service. By way of example, aggregation multiplexer 804 may also employ any other traffic management technique to output the ATM cells and the packets, including round robin, statistical multiplexing, and the like. The output of aggregation multiplexer 804 is then multiplexed, via a multiplexer 810, with flags from flag insert block 812 to delineate individual ATM cells and individual packets in the stream to be transmitted. The output of multiplexer 810 is then multiplexed, using a TDM multiplexer 814, with overhead information from overhead insert block 816. The output of multiplexer 814 is substantially as shown in FIGS. 5A and 5B.

Figure 9:
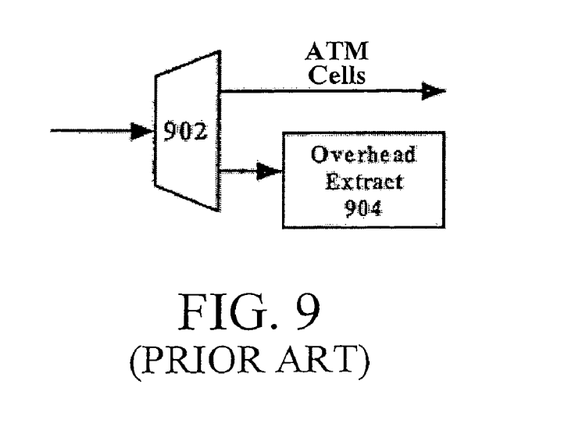
FIG. 9 is a prior art logical illustration of how ATM-over-SONET is accomplished at the receiving end.

FIG. 9 is a prior art logical illustration of how ATM-over-SONET is accomplished at the receiving end. In FIG. 9, the stream of ATM-over-SONET information is received a demultiplexer 902 wherein the SONET overhead information is extracted using an overhead extract block 904. The output of TDM demultiplexer 902 is a stream of ATM cells.

Figure 10:
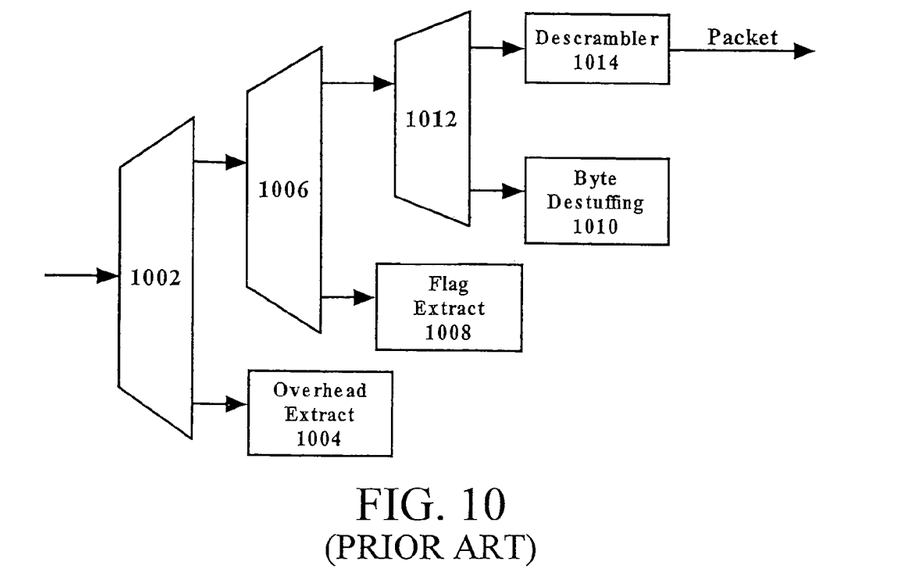
FIG. 10 is a prior art logical illustration of how packet-over-SONET is accomplished at the receiving end.

FIG. 10 is a prior art logical illustration of how packet-over-SONET is accomplished at the receiving end. In FIG. 10, the packet-over-SONET information is received at a demultiplexer 1002 wherein the SONET overhead information is extracted using an overhead extract block 1004. The output of demultiplexer 1002 is passed onto a demultiplexer 1006, which extracts the flag information from the stream of packets using a flag extract block 1008. The output of demultiplexer 1006 is then passed onto a demultiplexer 1012 and byte destuffing 1010, which reverses the byte-stuffing process discussed earlier. The output of demultiplexer 1012 is then passed onto a descrambler block 1014, which reverses the scrambling process discussed earlier. The recovered stream of packets is passed out on link 1016 of FIG. 10.

Figure 11:
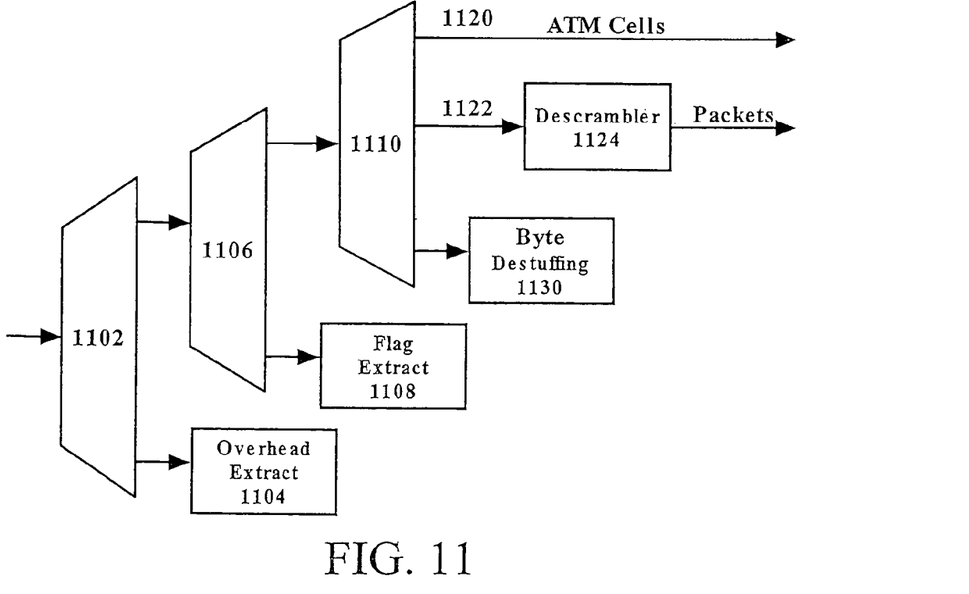
FIG. 11 illustrates, in accordance with one embodiment of the present invention, the receiving circuit for resolving the mixed ATM/packet over SONET information into respective ATM cells and packet information.

FIG. 11 illustrates, in accordance with one embodiment of the present invention, the receiving circuit for resolving the mixed ATM/packet over SONET information into respective ATM cells and packet information. In FIG. 11, the stream of mixed ATM/packet over SONET data is received at a demultiplexer 1102, wherein the SONET overhead information is extracted using an overhead extract block 1104. The output of demultiplexer 1102 is passed onto a demultiplexer 1106, which extracts the flag information from the streams of ATM cells and packets using a flag extract block 1008. Since the incoming stream is simply treated as a stream of packets at this point, the fact that there are 53-byte ATM "packets" in the stream of mixed ATM cells and packets is irrelevant from the perspective of demultiplexer 1106. The output of demultiplexer 1106 is then passed to a desegregation demultiplexer 1110. The job of desegregation demultiplexer 11 10 is to reverse the byte-stuffing process discussed earlier (using byte destuffing block 1130) and to discriminate ATM cells from packets and to separate the two.

The criteria by which desegregation demultiplexer 1110 discriminates ATM cells from packets vary depending on implementation. In one preferred implementation, packets are required to be larger than 53 bytes in size. Further, it is preferable that packets not be broken up into chunks less than 53 bytes in size to avoid being mistaken for an ATM cell. By way of example, the packets are required to have a minimum size of 64 bytes in one embodiment, which can be accomplished by padding smaller packets. Accordingly, this minimum size may be used as one criteria for discriminating between packets and ATM cells. In another embodiment, the ATM cells are tagged at the transmitting end with one or more special tags to identify them as ATM cells. These tags, which may be a unique pattern of bits/bytes, may then be employed as the discrimination criteria at the receiving end. In another embodiment, packets can have any size except 53 bytes (or the size that the ATM cell may have if the ATM cell is dressed up with additional information at the transmitting end). In this case, the ATM cell is preferably not broken up to avoid being mistaken for a packet, and the size may again be used as the discrimination criteria at the receiving end. In yet another embodiment, ATM cells are encapsulated in a packet-like envelope which are especially marked, thereby disguising them as simply packets so that they can be switched by switching equipment as if they are packets. This is particularly advantageous since the trend nowadays is toward packets, and more and more of the network comprises of packet switching and transmission equipment.

The output of desegregation demultiplexer 1110 are two streams: an ATM stream 1120 and a packet stream 1122. The packet stream 1122 is then descrambled by descrambler 1124 to reverse the scrambling process discussed earlier.

As can be appreciated by those skilled in the art, the inventive aggregated ATM/packet over SONET transmission technique advantageously permits both types of traffic to be mixed and transmitted over a single channel, which is preferably the entire bandwidth of the optical fiber or may be a portion of the bandwidth of an optical fiber. This is particularly useful in view of bandwidth-increasing technologies such as dense wavelength division multiplex (DWDM), which vastly increase the bandwidth capacity of the existing fiber. For service providers, the ability to eliminate the use of two separate optical fibers for two different types of traffic is a huge cost advantage.

Furthermore, the invention accomplishes the aggregation of ATM and packet traffic without resorting to inflexible and slow-to-reallocate TDM channels. With the present invention, the relative bandwidth between ATM cells and packets can be dynamically allocated at the transmitting end. As long as the bandwidth capacity of the optical fiber is not exceeded, dynamic allocation of bandwidth between ATM cells and packets and among different classes of service/priorities associated with the ATM cells and packets can be handled locally and dynamically as the ATM cells and packets are received. Local and rapid dynamic allocation control is possible since little or no coordination is needed with the receiving end to allow the discrimination process at the receiving end to sort out ATM cells from packets. In this manner, changing the relative bandwidth to handle a sudden increase in the bandwidth demand of a given type of traffic does not involve the time delay and/or complexity associated with unallocating and reallocating TDM channels. If desired, virtual channels may be created. Unlike the TDM channels of the prior art, however, these virtual channels may be flexibly and dynamically changed in size almost instantaneously to handle an increase in a given type of traffic. The fact that local traffic management can take place on an ATM-cell-by-ATM-cell basis and a packet-by-packet basis means that the invention can accommodate almost any traffic management scheme.

Figure 12:
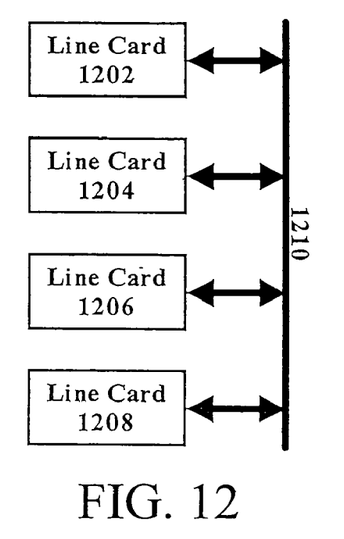
FIGS. 12 and 13 show one advantageous application of the inventive aggregated ATM/packet over SONET transmission technique, which is within the switching facility.
Figure 13:
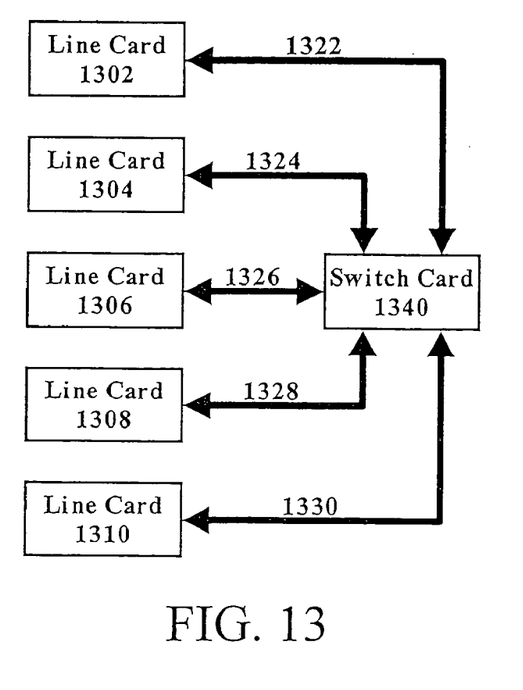

FIGS. 12 and 13 show one advantageous application of the inventive aggregated ATM/packet over SONET transmission technique, which is within the switching facility. FIG. 12 shows a prior art switch architecture wherein multiple line cards 1202, 1204, 1206, and 1208 are connected to a backplane bus 1210. These line cards may receive input data from a variety of sources. The data received from one line card may be switched to another line card via the backplane bus. However, as the transmission speed increases, the backplane bus is incapable of handling the higher speeds. By way of example, at STS-192 speed, the transmission rate is 10 Gbps and to switch 64 STS-192 ports the required backplane bandwidth of 640 Gbps vastly exceeds the capability of most backplane buses. Further, most switches are designed to handle either all ATM cells or all packets. Thus, backplane bus 1210 is typically unable to handle a mixture of ATM cells and packets during switching To resolve the speed bottleneck imposed by the prior art backplane bus approach of FIG. 11, there are currently systems that employ optical fibers to connect the line cards to a switch card. FIG. 12 shows one such scenario wherein optical lines 1322, 1324, 1326, 1328, and 1330 are employed to connect line cards 1302, 1304, 1306, 1308, and 1310 respectively to a switch card 1340. Since the backplane is not employed, the speed restriction of the backplane bus is not an issue, and the arrangement of FIG. 13 can handle a substantially higher transmission rate.

The present invention extends the architecture of FIG. 13 further in that the present invention permits both ATM cells and packets to be transmitted via a single optical link between each line card and the switch card 1340. This reduces the number of optical links required if a line card is configured to handle both ATM cells and packets. Due to the simplicity of the dynamic bandwidth allocation and traffic management associated with the present invention, the implementation cost may be kept reasonable to be commercially viable. This is an important advantage since space is at a premium inside most switch cabinets or racks. Additionally, such implementation is local within the switch and is completely transparent to the outside world, which may not be ready to accept the proposed protocol as a standard. At the receiving switch card, the mixed ATM/packet over SONET stream may be resolved into ATM cells and packets in the manner discussed earlier for switching purpose (assuming that the switch card can handle both ATM cells and packets). After switching, the invention may again be employed to send the mixed ATM/packet information over a single fiber to the receiving line card. At the receiving switch card, the mixed ATM/packet over SONET stream may be resolved into ATM cells and packets in the maimer discussed earlier for transmission to the next hop.

Additionally, if switch card 1340 is only a packet-only switch, it is contemplated that the ATM cells may be disguised at the originating line card with additional information to make the ATM cells look substantially like packets and allow the packet-only switch card to handle the switching therefor. By way of example, an ATM cell may be examined to ascertain its destination port, and a packet header containing that information may be created and attached to the ATM cell to make it look like a packet heading for the same destination port. In the context of the present invention, this may be done prior to aggregating the ATM cells and packets for transmission, for example.

At the receiving line card after switching, the ATM cells may be recovered by stripping away the added information, and the recovered ATM cells may be sent by the receiving line card to its next hop. In this manner, not only can the invention allow both ATM cells and packets to be sent on the same optical fiber in a manner that facilitates a more efficient way of traffic management and dynamic bandwidth allocation, but also allows the ATM cells to be switched by a packet-only switch. This is extremely valuable in the current network environment wherein there is a trend toward a packet-dominant network and associated switching infrastructure while there is still a large installed based of ATM equipments and traffic that require support. One skilled in the art should readily recognize at this point that by so disguising the ATM, the aspect of allowing a packet-only switch to handle ATM cell switching can apply also to switch arrangements that do not employ optical links, e.g., the backplane bus-based switch arrangement of FIG. 12.

While this invention has been described in terms of several preferred embodiments, there are alterations, permutations, and equivalents, which fall within the scope of this invention. By way of example, although SONET has been discussed as the preferred transport-layer protocol herein, it should be noted that the invention also extends to over transport-layer protocols such as SDH, SONET-LITE, DWDM, or the like and any other transport protocols capable of transporting variable length packets. Further, although optical fiber is discussed as the preferred physical medium, it should be noted that the invention may also apply to other physical medium such as electrically conductive media or wireless. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method, comprising:

transmitting a first flag followed by an ATM cell, wherein the ATM cell and the first flag are transmitted as a first part of a single wireless protocol frame, the first flag delineating a start of the ATM cell in the frame; and transmitting a second flag identical to the first flag followed by a packet, wherein the second flag and the packet are transmitted as a second part of the single wireless protocol frame, the second flag separating the packet from the ATM cell and delineating a start of the packet in the frame.

2. The method of claim 1, further comprising:

receiving the wireless protocol frame and using the first flag to identify the ATM cell and using the second flag to identify the packet.

3. The method of claim 1, wherein the second hag is a packet-over-SONET flag, and wherein the frame is a SONET frame.

4. The method of claim 1, wherein the first flag is a packet-over-SONET flag, and wherein the frame is a SONET frame.

5. The method of claim 1, wherein the first flag and the second flag are used by a receiver to discriminate ATM cells from packets.

* * * * *

UNITED STATES PATENT AND TRADEMARK OFFICE
CERTIFICATE OF CORRECTION

| | | |
|---|---|---|
| PATENT NO. | : 7,145,910 B2 | Page 1 of 1 |
| APPLICATION NO. | : 10/869379 | |
| DATED | : December 5, 2006 | |
| INVENTOR(S) | : Bidyut Parruck et al. | |

It is certified that error appears in the above-identified patent and that said Letters Patent is hereby corrected as shown below:

Column 12, Claim 3, line 14, "hag" should be corrected to -- flag --

Signed and Sealed this

Thirty-first Day of July, 2007

JON W. DUDAS
*Director of the United States Patent and Trademark Office*